US009367763B1

(12) United States Patent
Gordo Soldevila et al.

(10) Patent No.: US 9,367,763 B1
(45) Date of Patent: Jun. 14, 2016

(54) PRIVACY-PRESERVING TEXT TO IMAGE MATCHING

(71) Applicant: Xerox Corporation, Norwalk, CT (US)

(72) Inventors: Albert Gordo Soldevila, Grenoble (FR); Florent C. Perronnin, Domène (FR)

(73) Assignee: XEROX CORPORATION, Norwalk, CT (US)

( * ) Notice: Subject to any disclaimer, the term of this patent is extended or adjusted under 35 U.S.C. 154(b) by 2 days.

(21) Appl. No.: 14/594,321

(22) Filed: Jan. 12, 2015

(51) Int. Cl.
| | |
|---|---|
| *G06K 9/00* | (2006.01) |
| *G06K 9/62* | (2006.01) |
| *G06K 9/18* | (2006.01) |
| *G06K 9/52* | (2006.01) |
| *G06K 9/32* | (2006.01) |
| *G06F 17/30* | (2006.01) |
| *G06F 21/60* | (2013.01) |
| *G06F 17/11* | (2006.01) |

(52) U.S. Cl.
CPC .............. *G06K 9/6201* (2013.01); *G06F 17/11* (2013.01); *G06F 17/3053* (2013.01); *G06F 17/30244* (2013.01); *G06F 21/60* (2013.01); *G06K 9/18* (2013.01); *G06K 9/325* (2013.01); *G06K 9/52* (2013.01); *G06K 9/627* (2013.01); *G06K 9/6256* (2013.01); *G06K 9/6267* (2013.01)

(58) Field of Classification Search
None
See application file for complete search history.

(56) References Cited

U.S. PATENT DOCUMENTS

| | | | | |
|---|---|---|---|---|
| 8,452,108 | B2 * | 5/2013 | Walch ................ | G06K 9/00872 382/203 |
| 8,588,470 | B2 * | 11/2013 | Rodriguez Serrano ............ | G06K 9/6217 382/105 |
| 2003/0021481 | A1 | 1/2003 | Kasutani | |
| 2007/0005356 | A1 | 1/2007 | Perronnin | |
| 2007/0258648 | A1 | 11/2007 | Perronnin | |
| 2008/0069456 | A1 | 3/2008 | Perronnin | |
| 2008/0240572 | A1 | 10/2008 | Hoshii | |
| 2008/0317358 | A1 | 12/2008 | Bressan et al. | |
| 2009/0144033 | A1 | 6/2009 | Liu et al. | |
| 2009/0208118 | A1 | 8/2009 | Csurka | |
| 2010/0040285 | A1 | 2/2010 | Csurka et al. | |
| 2010/0082615 | A1 | 4/2010 | Clinchant et al. | |
| 2010/0092084 | A1 | 4/2010 | Perronnin et al. | |

(Continued)

OTHER PUBLICATIONS

U.S. Appl. No. 14/054,998, filed Oct. 16, 2013, Rodríguez-Serrano, et al.
U.S. Appl. No. 14/497,417, filed Sep. 26, 2014, Rodríguez-Serrano, et al.
Almazán, Jon, et al., "Handwritten word spotting with corrected attributes," The IEEE International Conference on Computer Vision (ICCV), pp. 1017-1024 (2013).

(Continued)

*Primary Examiner* — Shefali Goradia
(74) *Attorney, Agent, or Firm* — Fay Sharpe LLP

(57) ABSTRACT

A method for text-to-image matching includes generating representations of text images, such as license plate images, by embedding each text image into a first vectorial space with a first embedding function. With a second embedding function, a character string, such as a license plate number to be matched, is embedded into a second vectorial space to generate a character string representation. A compatibility is computed between the character string representation and one or more of the text image representations to identify a matching one. The compatibility is computed with a function that uses a transformation which is learned on a training set of labeled images. The learning uses a loss function that aggregates a text-to-image-loss and an image-to-text loss over the training set. The image-to-text loss penalizes the transformation when it correctly ranks a pair of character string representations, given an image representation corresponding to one of them.

22 Claims, 7 Drawing Sheets

(56) References Cited

U.S. PATENT DOCUMENTS

| | | | |
|---|---|---|---|
| 2010/0098343 A1* | 4/2010 | Perronnin | G06K 9/6226 382/224 |
| 2010/0150460 A1* | 6/2010 | Fan | G06K 9/72 382/232 |
| 2010/0189354 A1 | 7/2010 | de Campos et al. | |
| 2010/0191743 A1 | 7/2010 | Perronnin et al. | |
| 2010/0226564 A1 | 9/2010 | Marchesotti et al. | |
| 2010/0318477 A1 | 12/2010 | Perronnin et al. | |
| 2011/0026831 A1 | 2/2011 | Perronnin et al. | |
| 2011/0040711 A1 | 2/2011 | Perronnin et al. | |
| 2011/0052063 A1 | 3/2011 | McAuley et al. | |
| 2011/0072012 A1 | 3/2011 | Ah-Pine et al. | |
| 2011/0091105 A1 | 4/2011 | Perronnin | |
| 2011/0137898 A1 | 6/2011 | Gordo et al. | |
| 2011/0184950 A1 | 7/2011 | Skaff et al. | |
| 2012/0045134 A1 | 2/2012 | Perronnin et al. | |
| 2012/0076401 A1 | 3/2012 | Sanchez et al. | |
| 2012/0143853 A1 | 6/2012 | Gordo et al. | |
| 2012/0158739 A1 | 6/2012 | Ah-Pine et al. | |
| 2013/0129151 A1 | 5/2013 | Rodríguez Serrano et al. | |
| 2013/0129152 A1 | 5/2013 | Rodríguez Serrano et al. | |
| 2013/0182909 A1 | 7/2013 | Rodríguez-Serrano | |
| 2013/0259314 A1 | 10/2013 | Kozitsky et al. | |
| 2013/0336538 A1 | 12/2013 | Skaff et al. | |
| 2014/0056520 A1 | 2/2014 | Rodríguez Serrano | |
| 2014/0063263 A1 | 3/2014 | Bernal et al. | |
| 2014/0219563 A1 | 8/2014 | Rodríguez-Serrano et al. | |
| 2014/0270381 A1 | 9/2014 | Wu et al. | |

OTHER PUBLICATIONS

Almazán, Jon, et al., "Word spotting and recognition with embedded attributes" IEEE Trans. on Pattern Analysis and Machine Intelligence (TPAMI), vol. 36, Issue:12, pp. 2552-2566 (2014).

Frinken, V., et al., "A novel word spotting method based on recurrent neural networks," IEEE Trans. on Pattern Analysis and Machine Intelligence (TPAMI), 34:12, pp. 211-224 (2012).

Lowe, "Distinctive image features from scale-invariant keypoints," IJCV vol. 60(2), pp. 91-110 (2004).

Perronnin et al., "Fisher kernels on visual vocabularies for image categorization," CVPR, pp. 106-110 (2007).

Rodríguez-Serrano, José Antonio, et al., "Handwritten word-image retrieval with synthesized typed queries," ICDAR, pp. 351-355 (2009).

Rodríguez-Serrano, José Antonio, et al., "Label embedding for text recognition," BMVC, pp. 5.1-5.12 (2013).

Rodríguez-Serrano, José Antonio, et al. "Handwritten word-spotting using hidden Markov models and universal vocabularies," Pattern Recognition, 42.9: 2106-2116 (2009).

Sánchez, et al., "High-dimensional signature compression for large-scale image classification," in CVPR 2011, pp. 1665-1672 (2011).

Sánchez, et al., "Improving the fisher kernel for large-scale image classification," Proc. 11$^{th}$ European Conference on Computer Vision (ECCV): Part IV, pp. 143-156 (2010).

Sánchez, et al., "Image Classification with the Fisher Vector: Theory and Practice," International Journal of Computer Vision (IJCV) 105(3), pp. 222-245 (2013).

* cited by examiner

PRIVACY-PRESERVING TEXT TO IMAGE MATCHING

BACKGROUND

The exemplary embodiment relates to matching text to images and finds particular application in a system and method for performing one-directional matching which preserves the privacy of information in the image.

In "text-to-image" matching, the aim is to retrieve images in a dataset that match an input text query. One example of this is in license plate matching. In this case, given a license plate number in text format and a dataset of images of license plates, the aim is to find the images of license plates in the set that match the text query.

One method for performing such a matching involves embedding the text and images in a common vectorial space and learning a compatibility function between them (J. A. Rodríguez Serrano and F. Perronnin, "Label Embedding for Text Recognition," BMVC, pp. 5.1-5.12 (2013) and U.S. Pub. No. 20140219563 to Rodríguez Serrano, et al., hereinafter, collectively referred to as "Rodríguez Serrano 2013"). Although the compatibility function is trained with the objective of maximizing the "text-to-image" matching accuracy, it also performs well in "image-to-text" tasks, i.e., given an image signature, the image's transcription (contained text) can be retrieved. Although this property can be useful in some applications, in some cases it can be problematic. For example, if there were to be a security breach and the signatures of the images were leaked, someone with knowledge of how the system works could exploit this property to find the text matches for the image signatures. If the signatures encode nominal (personal) data, this could provide unauthorized information.

Other approaches for text-to-image matching include transcribing all the dataset images, and performing a text to text matching using a text distance such as Levenshtein distance (V. Frinken, et al., "A novel word spotting method based on recurrent neural networks," IEEE Trans. on Pattern Analysis and Mach. Intel. (TPAMI), 34:12, pp. 211-224 (2012). It is assumed that either the actual dataset images (not just the signatures) or the transcriptions are available on the system, and that privacy is not an issue. Making the image-to-text matching difficult would therefore render the system useless. In another approach, synthesized images are generated from the text queries and an image to image matching is performed (J. A. Rodriguez Serrano, et al., "Handwritten word-image retrieval with synthesized typed queries," Intl Conf. on Document Analysis and Recognition (ICDAR), pp. 351-355 (2009)). This method does not require storing the images or the transcriptions of the dataset on the system, only their signatures. While synthesizing image queries from the text offers some privacy guarantees, if the synthetizing technique were to be leaked, an attacker could synthesize its own text queries and match them against the stored signatures. Also, since synthetic images need to match the style of the dataset images, which may be unknown, this approach may lead to lower performance accuracy in some cases.

There remains a need for a method which allows high accuracy "text-to-image" matching but which limits the ability to perform "image-to-text" matching on the data.

INCORPORATION BY REFERENCE

The following references, the disclosures of which are incorporated herein by reference in their entireties, are mentioned:

Methods for computing Fisher Vectors are described, for example, in U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sánchez, et al., U.S. Pub. No. 20120045134, published Feb. 23, 2012, entitled LARGE SCALE IMAGE CLASSIFICATION, by Florent Perronnin, et al., Jorge Sánchez, et al., "High-dimensional signature compression for large-scale image classification," in CVPR 2011, Jorge Sánchez and Thomas Mensink, "Improving the fisher kernel for large-scale image classification," Proc. $11^{th}$ European Conference on Computer Vision (ECCV): Part IV, pp. 143-156 (2010), Jorge Sánchez, et al., "Image Classification with the Fisher Vector: Theory and Practice," International Journal of Computer Vision (IJCV) 105(3): 222-245 (2013), hereinafter, Sánchez 2013.

U.S. Pub. No 20140219563, published Aug. 7, 2014, entitled LABEL-EMBEDDING FOR TEXT RECOGNITION, by Rodríguez Serrano, et al., discloses a method for comparing a text image to a character string which includes embedding the character string and text image into a vectorial space and computing a compatibility between the two representations.

The following relate generally to methods for vehicle and license plate recognition: U.S. patent application Ser. No. 14/054,998, filed Oct. 16, 2013, entitled "DELAYED VEHICLE IDENTIFICATION FOR PRIVACY ENFORCEMENT," by José Antonio Rodríguez Serrano, et al.; U.S. application Ser. No. 14/497,417, filed 26 Sep. 2014, entitled MULTI-QUERY PRIVACY-PRESERVING PARKING MANAGEMENT SYSTEM AND METHOD, by José Antonio Rodriguez Serrano; U.S. Pub. No. 20130129151, published May 23, 2013, entitled METHODS AND SYSTEMS FOR IMPROVED LICENSE PLATE SIGNATURE MATCHING BY SIMILARITY LEARNING ON SYNTHETIC IMAGES, by José Antonio Rodríguez Serrano, et al.; U.S. Pub. No. 20130129152, published May 23, 2013, entitled METHODS AND SYSTEMS FOR IMPROVING YIELD IN WANTED VEHICLE SEARCHES, by José Antonio Rodríguez Serrano, et al.; U.S. Pub. No. 20130182909, published Jul. 18, 2013, entitled IMAGE SEGMENTATION BASED ON APPROXIMATION OF SEGMENTATION SIMILARITY, by José Antonio Rodríguez Serrano; U.S. Pub. No. 20130259314, published Oct. 3, 2013, entitled METHODS AND SYSTEMS FOR ENHANCING THE PERFORMANCE OF AUTOMATED LICENSE PLATE RECOGNITION APPLICATIONS UTILIZING MULTIPLE RESULTS, by Vladimir Kozitsky, et al.; U.S. Pub. No. 20130336538, published Dec. 19, 2013, entitled OCCUPANCY DETECTION FOR MANAGED LANE ENFORCEMENT BASED ON LOCALIZATION AND CLASSIFICATION OF WINDSHIELD IMAGES, by Sandra Skaff, et al.; U.S. Pub. No. 20140056520, published Feb. 27, 2014, entitled REGION REFOCUSING FOR DATA-DRIVEN OBJECT LOCALIZATION, by José Antonio Rodríguez Serrano; U.S. Pub. No. 20140063263, published Mar. 6, 2014, entitled SYSTEM AND METHOD FOR OBJECT TRACKING AND TIMING ACROSS MULTIPLE CAMERA VIEWS, by Edgar A. Bernal, et al.; and U.S. Pub. No. 20140270381, published Sep. 18, 2014, entitled METHODS AND SYSTEM FOR AUTOMATED IN-FIELD HIERARCHICAL TRAINING OF A VEHICLE DETECTION SYSTEM, by Wencheng Wu, et al.

BRIEF DESCRIPTION

In accordance with one aspect of the exemplary embodiment, a method for text-to-image matching includes storing a set of text image representations, each text image representation having been generated by embedding a respective text image into a first vectorial space with a first embedding function. With a second embedding function, a character string is embedded into a second vectorial space to generate a character string representation. For each of at least some of the text image representations, a compatibility is computed between the character string representation and the text image representation. This includes computing a function of the text image representation, character string representation, and a transformation. The transformation is one which has been derived by minimizing a loss function on a set of labeled training images, the loss function including a text-to-image-loss and an image-to-text loss. A matching text image is identified, based on the computed compatibilities.

One or more of the embedding and the computing of the compatibility may be performed with a processor.

In accordance with another aspect of the exemplary embodiment, a method for learning a compatibility function for use in a text-to-image matching system includes, for each of a set of training images, each labeled with a respective character string, generating a text image representation by embedding the training image into a first vectorial space with a first embedding function. With a second embedding function, the character strings are each embedded into a second vectorial space to generate character string representations. A compatibility function is learned, which is a function of a compatibility matrix, a character string representation of a character string to be matched, and a text image representation for one of a set of text images. The learning includes identifying a compatibility matrix which minimizes a loss function on the set of labeled training images. The loss function aggregates a text-to-image-loss and an image-to-text loss. The learned compatibility function, which includes the compatibility matrix which minimizes the loss function, is output.

One or more of the embedding and the learning of the compatibility function is performed with a processor.

In accordance with one aspect of the exemplary embodiment, a system includes a text image representation generator which, for each of a set of training images, each labeled with a respective character string, generates a text image representation by embedding the training image into a first vectorial space with a first embedding function. A text string representation generator embeds the character strings for the training images into a second vectorial space with a second embedding function to generate character string representations. A training component learns a compatibility function which is a function of a compatibility matrix, a character string representation of a character string to be matched, and a text image representation for one of a set of text images. The learning includes identifying a compatibility matrix which minimizes a loss function on the set of labeled training images. The loss function aggregates, over the set of images, a text-to-image-loss and an image-to-text loss. Optionally, the system includes a comparator which, given a representation of a text string to be matched, performs a comparison between the representation of the text string to be matched and each of a set of image representations using the learned a compatibility function. A processor implements the text image representation generator, text string representation generator, and training component, and comparator, if present.

DETAILED DESCRIPTION

Figure 1:
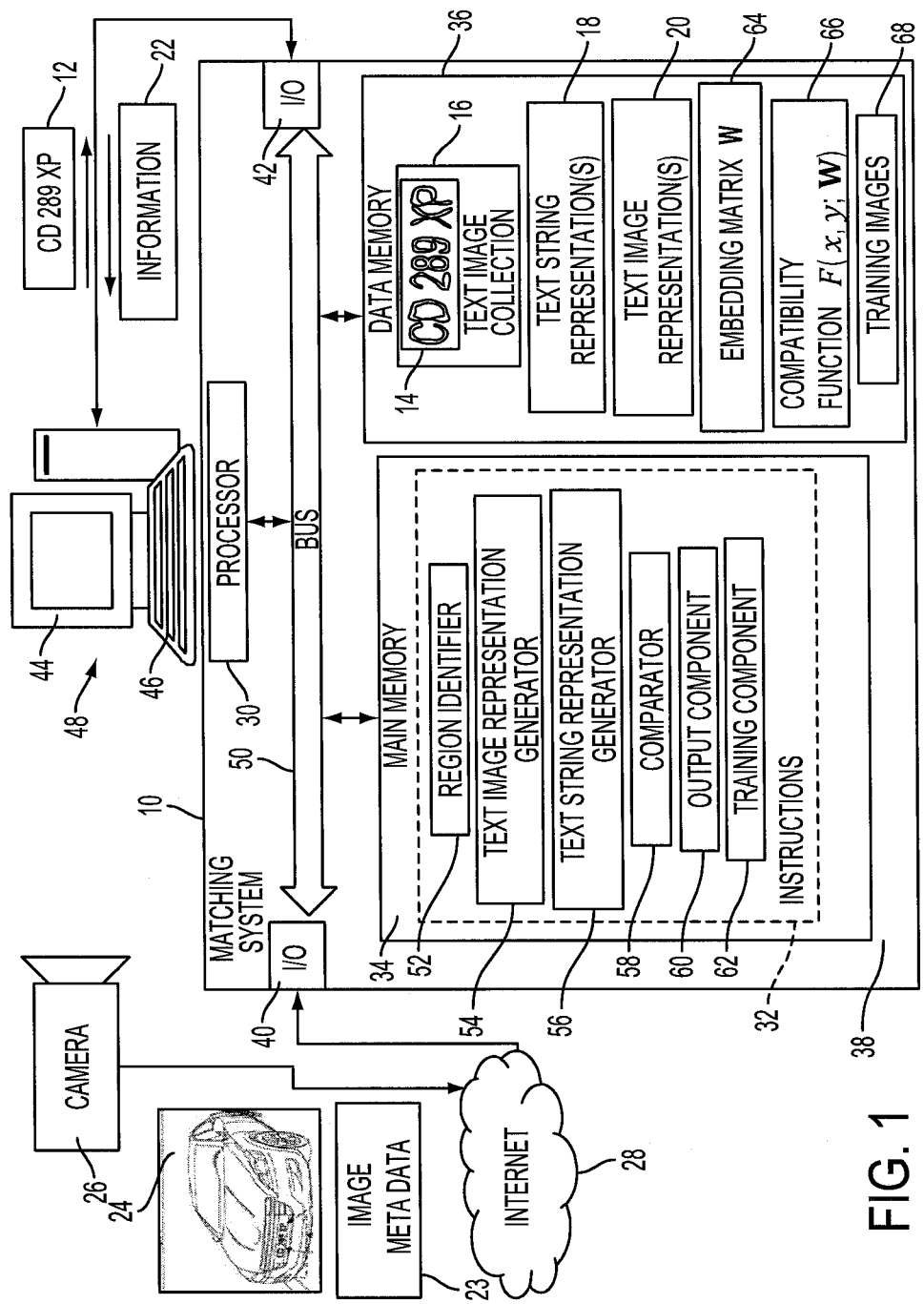
FIG. 1 is a functional block diagram of a system for text-to-image matching in accordance with one aspect of the exemplary embodiment.

Aspects of the exemplary embodiment relate to a system and method for text-to-image matching and to a system and method for training a compatibility function for use in such a system and method. The compatibility function allows text-to-image matching to be performed accurately while intentionally performing poorly on image-to-text matching to maintain the privacy of information contained in the images.

The exemplary embodiment finds particular application in connection with text-to-image matching for license plates. The method can perform matching using image signatures, with no need to keep the images themselves or their transcriptions in the system. Since license plate numbers are considered nominal data in some jurisdictions, this offers some significant benefits in terms of compliance as well as privacy.

To reduce the risk of an attacker gaining access to the license plate numbers of the images being matched, the exemplary system and method make it significantly more difficult to perform image-to-text matching than text-to-image matching.

In the exemplary system and method, the system of Rodríguez Serrano 2013 (referred to herein as the Baseline Approach) is modified to explicitly make the image-to-text matching more difficult while still allowing text-to-image matching with high accuracy. Briefly, the method of Rodríguez Serrano 2013 computes a vectorial representation (or image signature) for each of a set of images. Once the image signatures have been computed, there is no need to retain the images. Given a character string, such as a license plate number to be matched, the method of Rodríguez Serrano 2013 computes a vectorial representation of the character string. This can be performed, for example, by partitioning the character string into regions to form a spatial pyramid. The spatial pyramid includes a plurality of levels, where at each level, the regions in that level are formed by partitioning the regions at the previous level so that each successive level includes more (but smaller) regions than the preceding level. A representation of the characters in each region may then be computed, for example by counting the number of occurrences of each of a finite set of characters (such as those typically found in license plate numbers). Aggregation of the region representations results in a representation of the character string. A compatibility is computed between the text image representation and the character string representation by computing a function of the text image representation and character string representation which embeds the representations into a space in which matching is improved. The embedding is achieved with a transformation matrix (or vector) that is learned on a set of training samples. In the learning, the goal is to minimize, over all the training samples, an objective function which includes an empirical loss function which penalizes cases where a true image for a given label is ranked higher than an incorrect one.

In the present system and method, the method of Rodríguez Serrano 2013 is modified by one or both of:

1. Modifying the loss function, to penalize both incorrect text-to-image matches (as in Rodríguez Serrano 2013), and thus improving the system's text to image matching capability, but also to penalize correct image-to-text matches, thus making correct image-to-text matching more difficult. This can be achieved using two loss functions, one for penalizing the incorrect text-to-image matches, the other for penalizing correct image-to-text matches. This method is referred to herein as the Direct Approach.

2. Modifying the compatibility function between images and text. This leads to a biased compatibility function that is more flexible and requires an extra term to perform well at image-to-text matching. This term is used in training but is not needed for text-to-image matching. Then, this term is removed at test time, leading to a function that still works for text-to-image matching but is incomplete for the image-to-text task. This method is referred to herein as the Biased Approach.

With reference to FIG. 1, a functional block diagram of a computer-implemented matching system 10 is shown. The computer system 10 is configured for computing a measure of compatibility (similarity) between an input character (text) string 12, such as a license plate number, and a text image 14, such as an image of a license plate, to determine whether there is a match or to find the closest match from a collection 16 of two or more text images. Representations 18, 20 of the character string 12 and text image(s) 14, respectively, are generated and embedded into a space which allows a meaningful measure of compatibility (e.g., similarity) to be computed, without the need for OCR or other character recognition processing of the text image, and to output information 22 based thereon. The license plate number (also known as a registration identifier) is a numeric or alphanumeric code that uniquely identifies the vehicle on which it is mounted within the issuing region's database. As will be appreciated, the license plate number and image of a license plate are exemplary only and are used to illustrate the exemplary embodiment in which a representation 18 of a character string of characters drawn from a predefined, finite vocabulary is compared to one or more text image representations 20 (sometimes referred to as image signatures).

The illustrated system 10 is used for both training and matching. However, in practice, separate systems may be used, i.e., a training system and a matching system. In this case, various parts of the illustrated system may thus be omitted in each of the two systems, as discussed below.

Various forms of information 22 may be output based on the computed compatibility measure, which may depend on the use of the system 10. In one embodiment, information 22 is output that is associated with the text image 14 which is identified as being most similar to a given character string 12. In other embodiments, the information 22 output may include information associated with the text image 14 that meets (or exceeds) a threshold on the compatibility measure, if there is one. A combination of these approaches may be employed. The associated information 22 may be (or be derived) from metadata 23 associated with the most similar image 24. The metadata is generally information that is not based on the image data itself. Depending on the application, the information 22 associated with the text image 14 and or the metadata 23 may include one or more of a timestamp, a location identifier, and an identifier of the image.

The exemplary system 10 may be configured for receiving, as input, one or more images 24, which in the illustrated embodiment are images of vehicles acquired by an image capture device 26, such as a camera. In one embodiment, the system 10 may receive, as input, preprocessed text images 14, formed by localizing the text content in each image 24 and cropping the extraneous content out of the image. In another embodiment, the system 10 may receive, as input, representations 20, generated from the original or preprocessed text images 14. The system 10 may be communicatively connected with the image capture device 26 or with one or more intermediate computer-implemented image processing systems (not shown) via a wired or wireless connection 28, such as a local area network or a wide area network, such as the Internet. In some embodiments, the collection 16 includes a number of text-containing images 14, such as at least two or at least five or at least ten or a hundred text images 14, or representations 20 generated therefrom, which may be acquired and temporarily stored in memory of the system or in remote memory that is accessible to the system.

In the exemplary embodiment, the system 10 is configured for receiving a character string 12, which may be referred to herein as a label. In some embodiments, a plurality of character strings 12 may be received. The character strings 12 each comprise (or consist of) a sequence of characters that are drawn from a finite set of characters. Each character can be represented in the form of a binary code, which represents each character of the finite character set as a unique sequence of bits, such as a seven or more bit binary code, depending on the number of characters in the finite set. ASCII codes may be used although codes specifically designed for the system may alternatively be employed. In the license plate example, the character string may include the license plate number of a vehicle or vehicles authorized to park in a designated area or a license plate number of a stolen vehicle or vehicles.

In an exemplary embodiment, the system 10 may receive a character string 12 which is input as a query, for example, by a parking facility, transportation authority, law enforcement, vehicle owner, or the like, seeking information 22 concerning whether a vehicle corresponding to that license plate number, its location, and/or other information associated with a matching image is known. For example, the information 22 may be used to recover the car park entry time of a user with a lost ticket. In this embodiment, an image 14 and its associated time stamp 23 are captured when each vehicle enters the car park/obtains a parking ticket. When the vehicle owner indicates that the parking ticket is lost, the license number 12 can be entered into the system 10 and the time stamp 23 associated with the matching image is output as information 22. This information can be used to compute the parking fee, for example. Or, the associated information 22 may be used to perform security checks or perform "where is my car" searches. For example, images 14 of vehicles may be captured in various locations within a car park and their image signatures 20 indexed according to the location. When a driver (or other authorized person) wishes to know the vehicle location, the driver provides the system with the license plate number 12 and the system outputs the location 22 corresponding to the matching image. This may be particularly useful in large parking facilities, such as airport car parks. In all these cases, the images 14, 24 themselves can be deleted from memory as soon as the image signature 20 has been computed, thus the images are in memory only transitorily. This allows the system 10 to comply with regulations that prohibit the storage of personal information without express authorization from the person whose personal data is being acquired.

Figure 2:
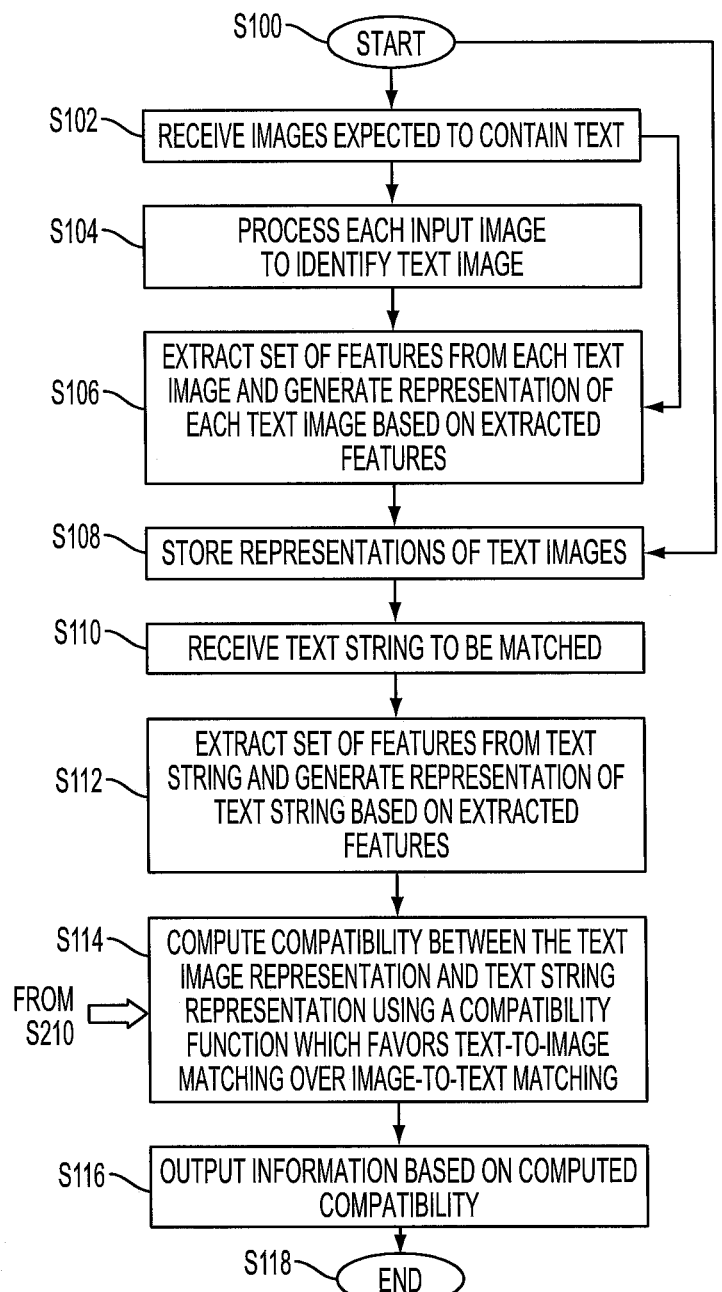
FIG. 2 is a flow chart illustrating a method for text-to-image matching in accordance with another aspect of the exemplary embodiment.

The illustrated computer system 10 includes a processor 30 which executes instructions 32 stored in main memory 34 for performing at least part of the method outlined in FIGS. 2 and/or 3. The processor device 30 may also control the overall operation of the computer system 10 by execution of processing instructions stored in memory 34. Data may be stored in data memory 36 that is integral with, or separate from, memory 34 and which may be resident on the same computing device 38, as shown, or on a remote computing device.

Computer system 10 also includes a network interface 40 and a user input/output (I/O) interface 42. The input/output interface 42 may communicate with one or more of a display device 44, such as a computer monitor or other screen, for displaying information to users, and a user input device 46, such as a keyboard or touch or writable screen, and/or a cursor control device, such as mouse, trackball, or the like, for inputting text, such as text string 12, and for communicating user input information and command selections to the processor 30. Display device 44 and user input device 46 may be directly linked to the computer 38, or may form parts of a client computing device 48 which is linked to the system by a wired or wireless connection analogous to link 28. The various hardware components 30, 34, 36, 40, 42 of the computer 38 may be all communicatively connected by a bus 50. The computer 38 may be a PC, such as a desktop, a laptop, palmtop computer, portable digital assistant (PDA), server computer, cellular telephone, tablet computer, pager, combination thereof, or other computing device capable of executing instructions for performing the exemplary method.

The memory 34, 36 may represent any type of non-transitory computer readable medium such as random access memory (RAM), read only memory (ROM), magnetic disk or tape, optical disk, flash memory, or holographic memory. In one embodiment, the memory 34, 36 comprises a combination of random access memory and read only memory. In some embodiments, the processor 30 and memory 34 and/or 36 may be combined in a single chip. The network interface 40, 42 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 30 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

The illustrated instructions 32 include some or all of a region identifier component 52, a text image representation generator 54, a text string representation generator 56, a comparator 58, an information output component 60, and a training component 62. These components are best understood with respect to the method described with reference to FIG. 2.

Briefly, the region identifier component 52 receives an input image 24, which is expected to contain an image segment containing a text string, and identifies a text image 14 (i.e., only a part of the input image 24), likely containing a text string. The text image 14 is temporarily stored in memory 36. The region identifier component 52 is optional if the text images 14 have been generated elsewhere.

The text image representation generator 54 generates a multidimensional vectorial representation 20 of each text image 14, which may be based on low level features extracted from patches of the text image 14. Once the text image representation 20 has been generated, the original text image 14 and corresponding vehicle image 24, if any, may be deleted from system memory, encrypted, or stored elsewhere, so that they are no longer accessible to the system 10. In other embodiments, the system may receive, as input, the already generated text image representations 20 and thus the text image representation generator 54 may be omitted.

The text string representation generator 56 operates on the input character string 12 to generate a multidimensional representation 18 of the string 12. In the exemplary embodiment, the representation 18 is generated in a Euclidian space, and can be a spatial pyramid bag of characters (SPBOC) representation, generated by the method described in Rodríguez Serrano 2013, as discussed briefly below.

The comparator 58 compares the vectorial representations 18, 20 using a compatibility function 66 to generate a measure of compatibility, such as a similarity score. The compatibility function is a function of the two vectorial representations 18, 20 and a transformation 64, which may be in the form of a compatibility matrix, although other transformations are also contemplated.

The information output component 60 outputs information 22 based on the similarity score for one or more text images. As examples, the information may include whether the text image 14 and the text string 12 are a match, the most likely match from the collection 16, or information associated with the matching image.

The training component 62 learns the compatibility matrix 64 for the embedding function 66 using vectorial representations, computed as for representations 18, 20, from a set of labeled training images 68, the labels being analogous in form to character string 12. As will be appreciated, the compatibility matrix 64 may be learned by a training system that is separate from the matching system. In this case, the training system may include components 52, 54, 56, and 62 and the matching system may include components 56, 58, 60, optionally with components 52 and 54. In other embodiments, components 52, 54 may be a part of a separate computer system (or systems) which supplies the text image representations 20 and associated capture information 23 to the matching system.

FIG. 2 illustrates a method for text recognition which can be performed with the system of FIG. 1. The method begins at S100.

At S102, at least one image 24 which is expected to contain a visual text string is optionally received and stored in memory 36. The method may take as input a single image 24, or a collection of images to be processed.

Optionally, at S104, for each image 24, a text image 14 (region of interest), likely containing the visual text string, is identified within the input image 24, by the region identifier component 52, and stored in memory.

At S106, features are extracted from each text image 14 and a vectorial representation 20 of each text image 14 is generated, based on the features extracted, by the text image representation generator 54. The exemplary text image representations 20 are Fisher vectors, Bag-Of-Visual Words (BOV) or other representations derived from features extracted from patches of the image.

At S108, the text image representations 20 are stored in memory 36 and the original images may be deleted or otherwise rendered inaccessible to the system. In other embodiments, the representations 20 may be generated elsewhere and received into memory 36 of the system. In some embodiments, a function of each representation and the embedding function may be stored to reduce computation at run time, e.g., as $\phi(x)^T W$, where $\phi(x)$ represents the text image representation and W represents the compatibility matrix.

At S110 at least one character string 12 (or "label") for which a text string representation 18 is to be generated is received and stored in memory 36.

At S112, features are extracted from the character string 12 and a vectorial representation 18 of the character string 12 is generated based on the extracted features, by the text string representation generator 56. The vectorial representation 18 is stored in memory 36. In the exemplary embodiment, the character string is recursively partitioned into regions and for each region, a representation based on the characters wholly or partially present in the region is generated. The region representations are aggregated to form a text string representation.

Figure 3:
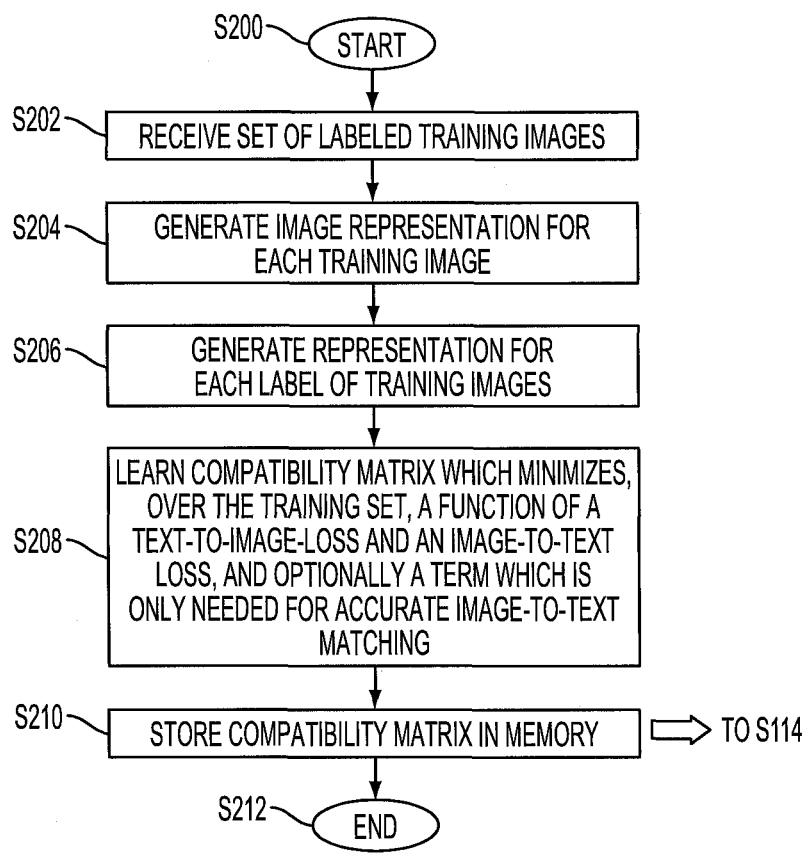
FIG. 3 illustrates training of the compatibility matrix the method of FIG. 2.

At S114, the two multidimensional representations 18, 20 are compared by the comparator 58, using the compatibility function 66, to generate a compatibility measure, such as a similarity score. FIG. 3 illustrates methods for learning the compatibility matrix 64 which is employed in the compatibility function 66. In some embodiments, one or both of the representations may be embedded with the compatibility matrix 64 prior to performing the comparison. The comparison can include determining whether the computed similarity score for the two representations exceeds a threshold on the similarity score. If so, they are determined to be a match or a potential match. The compatibility matrix favors text-to-image matching over image-to-text matching, i.e., if used to identify one of a set of text strings that matches an image performs much worse, in terms of accuracy, than it does when used for identifying one of a set of images which matches a given text string.

At S116, information 22 based on the comparison is output by the output component 60. Where the method is used to find a single match for a given input text string, such as a license plate number, in a collection of text image representations 20, such as representations of license plate images, the information output may be based on information 23 associated with a closest matching one (or more) of the license plate images. This may be conditional on the comparison score being above a predetermined threshold. The output information 22 may include information about the location of the vehicle, for example the location of the camera which captured the respective license plate image, a time stamp associated with the captured image, permission to retrieve the original image 24 or cropped image 14, or the like.

The method ends at S118. The method can return to one of the earlier steps when a new image or new character string is received.

The method of FIG. 2 assumes that a comparison function 66 has been learned for comparing the two representations. FIG. 3 illustrates an example method for learning the comparison function, which is described more fully below. The method may be implemented by the training component 62 of the system 10, which calls on other components previously described, or may be performed on a separate computing device.

The method begins at S200.

At S202, a set 68 of training images, similar to images 14, is received. Each training image has a manually assigned label which is the character string that a human reviewer has recognized in the image, such as the sequence of letters and numbers forming a license plate number. The character string (label) thus consists of a sequence of characters selected from the same finite set of characters used for the query 12.

At S204, an image representation is generated for each training image with image representation generator 54, in the same manner as for the test image 14 as described for S106, e.g., using Fisher vectors.

At S206, a representation is generated for each label, with text string representation generator 56, as described for S112, S114.

At S208 a compatibility matrix 64 is learned which optimizes a loss function that employs a text-to-image-loss and an image-to-text loss, and optionally a term which is only needed for accurate image-to-text matching. The learning is performed by minimizing, over the training samples, a weighted function of the text-to-image-loss and the image-to-text loss, and optionally a term which is only needed for accurate image-to-text matching. The matrix 64 can be learned using stochastic gradient descent, or other learning methods.

At S210, the learned compatibility matrix 64 and any other parameters are stored in memory, such as memory 36. The method ends at S212 and/or may proceed to S114 of FIG. 2.

The method illustrated in FIG. 2 and/or FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 3, can be used to implement the method.

As will be appreciated, the steps of the method(s) need not all proceed in the order illustrated and fewer, more, or different steps may be performed.

Further details of the system and method will now be described.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

1. Baseline Approach

First, a Baseline method will be described. This corresponds to the method of Rodríguez Serrano 2013. A first encoding function $\phi: \mathcal{J} \to \mathbb{R}^d$ encodes an image 14 in a space $\mathcal{J}$ into a vectorial representation 20 in a space $\mathbb{R}^d$, and a second encoding function $\varphi: \mathcal{S} \to \mathbb{R}^D$ encodes a text string 12 in a space $\mathcal{S}$ into another vectorial representation 18 in a space $\mathbb{R}^D$, where $\mathbb{R}$ denotes the set of real numbers and d and D are the dimensions of the vectorial representation of the text image and the text string, respectively. In the examples below, $\phi$ is a Fisher vector encoding and $\varphi$ is a bag-of-characters encoding, such as an SPBOC encoding.

In the method of Rodríguez Serrano 2013, a compatibility function of the form $F: \mathcal{J} \times \mathcal{S} \to \mathbb{R}$ is learned that assigns a score depending on how compatible are the image 14 and the text string 12. In practice, the compatibility function F is a bilinear form, such as $F(x,y;W) = \phi(x)^T W \varphi(y)$, where $\phi(x)$ denotes the representation 20 of an image x, $\varphi(y)$ denotes the representation 18 of a text string y, W represents a d×D compatibility matrix, and T represents the transpose operator. Thus, given a representation $\phi(x)$ of a text image x 14 and a representation $\varphi(y)$ of a character string y 12, a compatibility score is computed by computing $F(x,y;W)$, i.e., by multiplying the vectors 18, 20 representing the text string and image when embedded into a new space using the matrix W. W essentially provides a weight for each pair of features, one from the image representation and one from the text string representation.

In text-to-image matching, the Baseline method enforces that given a text string, the relevant images to that text string are given a higher compatibility score than the irrelevant ones. Once the compatibility matrix W has been learned, the text-to-image matching is reduced to finding the closest image x∈X to the query y, i.e., $$x^* = \underset{x \in X}{\operatorname{argmax}} F(x, y; W), \qquad (1)$$

i.e., given a text string y, the optimum image x* is the one which maximizes the function F(x,y;W) over all images. This can be solved with a nearest neighbor search.

To learn the optimal W, a large-margin framework can be used. This method assumes that there is access to N pairs of training samples: $\mathcal{T} = \{(x_1, y_1), (x_2, y_2), \ldots, (x_N, y_N)\}$. It is also assumed that, given an index i, a set $\mathcal{P}_i$ can be constructed that contains the indexes of all the elements in the training set that share their label (i.e., the textual transcription) with $x_i$, and also a set $\mathcal{N}_i$ that contains the indexes of all the elements in the training set that do not share their label with $x_i$. For the sake of compactness, an index randomly sampled from $\mathcal{P}_i$, $i^+$: $\mathcal{P}_i$ is denoted simply as $i^+$. Similarly, $i^-$ is an index randomly sampled from $\mathcal{N}_i$.

Given a triplet $(i, i^+, i^-)$, the triplet text-to-image loss can be defined as:

$$l_{t2i} = (y_i, x_{i^+}, x_{i^-}; W) = \max(0, 1 - (F(x_{i^+}, y_i; W) - F(x_{i^-}, y_i; W))) \qquad (2)$$

$$= \max(0, 1 + \Delta^T W \varphi(y_i)),$$

where $\Delta = \phi(x_{i^-}) - \phi(x_{i^+})$.

Then the goal is to minimize the triplet text-to-image loss over all possible samples:

$$W^* = \underset{W}{\operatorname{argmin}} \sum_{(i, i^+, i^-)} l_{t2i}(y_i, x_{i^+}, x_{i^-}; W) + R \qquad (3)$$

where R is an optional regularization term which includes a regularization parameter $\lambda$ and W which penalizes larger values for the weights in the matrix W. For example, $R = \lambda \|W\|$. In some embodiments, R=0.

Since sampling all the possible triplets may not be feasible, random subsampling can be used. The objective function is then optimized using Stochastic Gradient Descent, e.g., with a fixed step size, or with another gradient descent method. An algorithm in pseudocode for performing the Baseline method training is shown in Algorithm 1.

Algorithm 1 Learn Baseline W

Input: Training pairs $\mathcal{T} = \{(x_1, y_1), (x_2, y_2), \ldots, (x_N, y_N)\}$.
Input: Number of epochs, step size $\eta$.
Output: Matrix W.
    Initialize W randomly from $\mathcal{N}(0, 1/D)$
    for number of epochs do
        Shuffle indexes: IDXS = shuffle(1 ... N)
        for i ∈ IDXS do
            Draw an index $i^+$ from $\mathcal{P}_i$
            Draw an index $i^-$ from $\mathcal{N}_i$
            Set $\Delta = \phi(x_{i^+}) - \phi(x_{i^-})$.
            Compute text-to-image loss $l_{t2i} = \max(0, 1 + \Delta^T W \varphi(y_i))$
            if $l_{t2i} > 0$ then
                Stochastic update of W:
                $w^{t+1} = W^t - \eta \Delta \varphi(y_i)^T$
            end if
        end for
    end for As can be seen from Algorithm 1, the algorithm assumes a set of N training pairs, i.e., text images x and their respective true labels y. In a typical stochastic gradient descent process, the entire training set is processed in a number of epochs, generally at least 500 or 1000 epochs may be employed for achieving an accuracy of about 90% or higher on a validation set of training samples that were not used in the training. At each epoch, the training set indices are shuffled and for each index i in the shuffled indices, an index $i^+$ is drawn from the set $\mathcal{P}_i$ of indices with the same label as i and an index $i^-$ is drawn from the larger set $\mathcal{N}_i$ of indices which do not have the same label. $\Delta$ is defined as the difference between the respective embeddings of the images corresponding to these indices $\phi(x_{i^+})$ and $\phi(x_{i^-})$. For this pair, the text-to-image loss $l_{t2i}$ is computed, which is a function of $\Delta$, W, and the label embedding $\phi(y_i)$ of the true label $y_i$ of image $x_i$, (provided this is greater than 0). In Algorithm 1, the text-to-image loss is computed as the hinge loss: $\max(0,1+\Delta^T W\phi(y_i))$. If $l_{t2i}$ is greater than 0, this means that the matrix W has incorrectly ranked the embeddings with respect to the true label, i.e., $\phi(x_{i^-})$ is ranked higher than $\phi(x_{i^+})$, and thus the matrix is updated by $W^{t+1}=W^t-\eta\Delta\phi(y_i)^T$, where the step size $\eta$ is selected to provide a small update to W each time it is updated.

It may be noted that this algorithm only optimizes the text-to-image loss $l_{t2i}$. However, it is observed experimentally that the learned compatibility function also performs well in the image-to-text task, even though it is not explicitly trained for it, i.e., $$y^* = \underset{y \in Y}{\operatorname{argmax}} F(x, y; W), \quad (4)$$

i.e., the optimum label is the one which maximizes the function F (x, y; W) over all labels.

In the following two approaches, a compatibility function is learned that performs well on the text-to-image task but does not perform well in the image-to-text task, i.e., preserves privacy of the information captured in the images. Thus, even if an attacker gains access to the image signatures and matrix W, little or no useful information can be extracted concerning the true labels.

2. Direct Approach

In this approach, a similar framework to that used in the Baseline approach is followed, and the same notations are used for the same items. As with the Baseline method, a compatibility function 66 of the form F (x, y; W)=$\phi(x)^T W\phi(y)$ is defined and during training (S208), the empirical loss is minimized on the training set. A difference from the baseline approach is that the empirical loss also includes a loss that penalizes the image-to-text accuracy. The empirical loss function is constructed as the combination of two losses. The first, a triplet text-to-image loss denoted $l_{t2i}$, enforces the text-to-image consistency, and is the same as that used in the Baseline approach (Equation (2)). The second, a triplet image-to-text loss, denoted $l_{i2t}$, addresses the image-to-text consistency, and ensures that text strings are badly ranked:

$$l_{i2t}(x_i, y_{i^+}, y_{i^-}; W) = \max(0, 1 - (F(x_i, y_{i^-}; W) - F(x_i, y_{i^+}; W))) \quad (5)$$
$$= \max(0, 1 + \phi(x_i)^T W\hat{\Delta}),$$

where $\hat{\Delta}=\phi(y_{i^+})-\phi(y_{i^-})$.

The triplet image-to-text loss $l_{i2t}(x_i,y_{i^+},y_{i^-};W)$ penalizes the case when the current W ranks the correct embedded label $\phi(y_{i^+})$ higher than the incorrect one $\phi(y_{i^-})$. As will be appreciated, Eqn (5) may include a regularization term as for Eqn (3). The exemplary loss functions $l_{t2i}$ and $l_{i2t}$ may be computed as the hinge loss, although other loss functions may be employed, such as the squared hinge loss or the logistic loss.

The final objective function that is minimized is one which minimizes, over all the triplets considered, a function of the first and second losses, e.g., an aggregate, such as a weighted sum, which can be represented as follows:

$$W^* = \underset{W}{\operatorname{argmin}} \sum_{(i,i^+,i^-)} l_{t2i}(y_i, x_{i^+}, x_{i^-}; W) + \alpha l_{i2t}(x_i, y_{i^+}, y_{i^-}; W) \quad (6)$$

where W* is the optimal compatibility matrix and $\alpha$ is a weighting parameter that balances the two conflicting requirements. $\alpha$ can be determined through cross-validation and is non-zero, i.e., $0<\alpha$ and, in some embodiments, $\alpha<1$. As will be appreciated, if $\alpha$ is too large, it may make it difficult to achieve good performance on text-to-image matching when the matrix W is used in text-to-image matching. In some embodiments, $\alpha$ is up to $10^{-2}$ or up to $10^{-3}$, and may be at least $10^{-6}$ or at least $10^{-6}$, e.g., from $5\times10^{-6}$ to $5\times10^{-3}$. In some embodiments, Eqn. (6) includes a regularization term R, as for Eqn. (3).

To optimize the overall loss function on the training set, the same strategy as for the baseline can be followed. In one embodiment, the method alternates between optimizing $l_{t2i}$ and $l_{i2t}$ on each triplet. An exemplary algorithm is described in Algorithm 2.

---
Algorithm 2: Learn Direct W
---
Input: Training pairs $\mathcal{T} = \{(x_1, y_1), (x_2, y_2), \ldots, (x_N, y_N)\}$.
Input: Number of epochs, step size $\eta$, weight $\alpha$.
Output: Matrix W.
   Initialize W randomly from $\mathcal{N}(0,1/D)$
   for number of epochs do
     Shuffle indexes: IDXS = shuffle (1 ... N)
     for i $\in$ IDXS do
       Draw an index $i^+$ from $\mathcal{P}_i$
       Draw an index $i^-$ from $\mathcal{N}_i$
       Set $\Delta = \phi(x_{i^-}) - \phi(x_{i^+})$.
       Set $\hat{\Delta} = \varphi(y_{i^+}) - \varphi(y_{i^-})$.
       Compute text-to-image loss $l_{t2i} = \max(0, 1 + \Delta^T W \varphi(y_i))$
       if $l_{t2i} > 0$ then
         Stochastic update of W:
         $W^{t+1} = \eta \Delta \varphi(y_i)^T$
       end if
       Compute image-to-text loss $l_{i2t} = \max(0, 1 + \phi(x_i)^T W \hat{\Delta})$
       if $l_{i2t} > 0$ then
         Stochastic update of W:
         $W^{t+1} = W^t - \alpha\eta \varphi(x_i)\hat{\Delta}^T$
       end if
     end for
   end for
---

The update for W in the direct approach is the same as for the Baseline in the case where $l_{t2i}>0$. However, Algorithm 2 adds additional steps to update W when $l_{i2t}>0$ in order to penalize correctly ranked labels, i.e., when the true label is given a higher score. The update for W in this case is a function of $\alpha$, $\eta$, $\phi(x_1)$, and the difference $\hat{\Delta}$. Note that $\hat{\Delta}$ is the difference between the correct label and the incorrect label representations, thus penalizing the cases where the correct label scores higher, while $\Delta$ is the difference between the incorrect image and the correct image representations, thus penalizing the cases where the incorrect image score higher.

While Algorithm 2 uses both $l_{t2i}$ and $l_{i2t}$ to potential update W for the same triplet, in other embodiments, $l_{t2i}$ may be computed for one triplet and $l_{i2t}$ is computed for another triplet, e.g., alternatively. In other embodiments, for a number of epochs, only the $l_{t2i}$ loss function is used to update W, i.e., effectively $\alpha$ is 0. Then, $\alpha$ is then set to a non-zero value for a number of epochs. In other embodiments, $\alpha$ may be set at a lower value for earlier epochs than is used for later epochs. In some embodiments, $\alpha$ is progressively increased in a number of increments, e.g., at several epochs, for at least some of the epochs. The step size $\eta$ can be, for example, from $10^{-5}$ to $10^{-1}$, such as $10^{-2}$. The step size may be fixed or may vary from one epoch to a next epoch.

3. Biased Approach

The Direct approach optimizes both goals of keeping a high text-to-image accuracy while making image-to-text matching more difficult. The Biased method is similar to the Direct method in that it uses two loss functions, as described above. However, in the Biased method, a biased compatibility function 66 of the form $F(x, y; W, V) = \phi(x)^T W \phi(y) + V^T(y)$ is learned, where V is a parameter vector whose dimensionality is the same as the text string embedding dimensionality D. Once W and V have been learned, V is discarded, and only W is kept. Thus, V is not accessible to the system 10 once W has been computed, and is either deleted from system memory 34, 36, or in another embodiment, a different computer is used for training, and only W is provided to the system 10 for use in text-to-image matching. Consequently, even if an attacker gains access to the image signatures and the matrix W, computing labels for the images based on their signatures using Eqn (4) produces results which are generally not in agreement with their true labels, or at least are correct much less frequently than when V is not used in training, for example, would output an incorrect label more often than the true label given a random set of image signatures. While the performance is poor for image-to-text matching, it can be high, such as at least 85% or at least 90% correct in the case of text-to-image matching.

The compatibility function incorporating V has two advantages over the one used in the Baseline and Direct Approaches. First, the extra term allows more flexibility to learn the boundaries between the two problems. Second, although the term V is important to the image-to-text matching task, it is not to the text-to-image matching task. This is evident when the search problem is formulated explicitly:

$$x^* = \underset{x \in X}{\operatorname{argmax}} F(x, y; W, V) = \underset{x \in X}{\operatorname{argmax}} \phi(x)^T W \varphi(y) + V^T \varphi(y) \quad (7)$$

$$= \underset{x \in X}{\operatorname{argmax}} \phi(x)^T W \varphi(y)$$

$$y^* = \underset{y \in Y}{\operatorname{argmin}} F(x, y; W, V) = \underset{y \in Y}{\operatorname{argmax}} \phi(x)^T W \varphi(y) + V^T \varphi(y) \quad (8)$$

$$\neq \underset{y \in Y}{\operatorname{argmax}} \phi(x)^T W \varphi(y)$$

Therefore, by learning V and then discarding it two goals are achieved: learning a better W, since it has to make a lesser effort to learn the boundaries, and explicitly disrupting the image-to-text task at test time. In this case, the image-to-text loss $l_{i2t}$ used in training is a function of $x_i, y_{i^+}, y_{i^-}; W$, and V, and can be defined as:

$$l_{i2t}(x_i, y_{i^+}, y_{i^-}; W, V) = \max(0, 1 - (F(x_i, y_{i^-}; W, V) - \quad (9)$$

$$F(x_i, y_{i^+}; W, V)))$$

$$= \max(0, 1 + \phi(x_i)^T W \hat{\Delta} + V^T \hat{\Delta}), \quad (10)$$

where $\hat{\Delta} = \phi(y_{i^+}) - \phi(y_{i^-})$, as for the Direct approach. The text-to-image loss $l_{t2i}$ remains the same, since the V term gets canceled and does not get updated.

The final objective function that combines both conflicting requirements is as follows:

$$W^* = \underset{W}{\operatorname{argmin}} \sum_{(i,i^+,i^-)} l_{t2i}(y_i, x_{i^+}, x_{i^-}; W) + \alpha l_{i2t}(x_i, y_{i^+}, y_{i^-}; W, V) \quad (11)$$

where, again, $\alpha$ is a parameter which can be learned by cross-validation.

Eqn (11) optionally includes a regularization term, as for Eqns (3) and (6), but in this case two regularization terms may be used, one for W and one for V. To learn W and V, a similar approach to that used in the Direct case can be employed, e.g., by alternating computation of $l_{i2t}$ and $l_{t2i}$. This is shown in Algorithm 3.

---

Algorithm 3: Learn Biased W, V

---

Input: Training pairs $\mathcal{T} = \{$
Input: Number of epochs, step size $\eta$, weight $\alpha$.
Output: Matrix W.

Initialize W randomly from $\mathcal{N}(0, 1/D)$
    Initialize V randomly from $\mathcal{N}(0, 1/D)$
    for number of epochs do
        Shuffle indexes: IDXS = shuffle(1 ... N)
        for i ∈ IDXS do
            Draw an index $i^+$ from $\mathcal{P}_i$
            Draw an index $i^-$ from $\mathcal{N}_i$
            Set $\Delta = \phi(x_{i^-}) - \phi(x_{i^+})$.
            Set $\hat{\Delta} = \varphi(y_{i^+}) - \varphi(y_{i^-})$.
            Compute image-to-text loss $l_{i2t} = \max(0, 1 + \Delta^T W \varphi(y_i))$
            if $l_{i2t} > 0$ do
                Stochastic update of W:
                    $W^{t+1} = W^t - \eta \Delta \varphi(y_i)^T$
            end if
        Compute text-to-image loss:
            $l_{t2i} = \max(0, 1 + \phi(x_i)^T W \hat{\Delta} + V^T \hat{\Delta})$
            if $l_{t2i} > 0$ do
                Stochastic update of W:
                    $W^{t+1} = {}^t - \alpha \eta \phi(x_i) \hat{\Delta}^T$
                Stochastic update of V: $V^{t+1} = V^t - \alpha \eta \hat{\Delta}$
            end if
        end for
    end for

---

Algorithm 3 is thus the same as Algorithm 2, except that it introduces the term $V^T \hat{\Delta}$ in the image-to-text loss $l_{i2t}$ and performs an update of V when the loss $l_{i2t}$ is greater than 0.

In each of the three methods, given a text query y (at S110), it is encoded with $\phi$ (at S112), and the nearest image in the dataset 16 is identified (at S114) as being the one which maximizes $\phi(x)^T W \phi(y)$:

$$x^* = \underset{x \in X}{\operatorname{argmax}} F(x, y; W) = \underset{x \in X}{\operatorname{argmax}} \phi(x)^T W \varphi(y) \quad (12)$$

It may be noted that if the number of elements d and D in the two vectors are large, then the matrix W may be large, in which case it may be advantageous to consider a low-rank decomposition of W as a product of two matrices. In this case an approximation $\approx U^T V$ may be used, with $U \in \mathbb{R}^{R \times d}$ and $V \in \mathbb{R}^{R \times D}$, where R<d and R>D. In such a case, $F(x,y;W) = (U\phi(x))^T W(V\phi(y))$. Thus, $F(x,y;W)$ is a dot-product in an R-dimensional space.

Thus, retrieving the nearest image in the dataset using Eqn (12) is equivalent to retrieving one which minimizes $(U\phi(x))^T W(V\phi(y))$:

$$x^* = \underset{x \in X}{\operatorname{argmin}} F(x, y; W) = \underset{x \in X}{\operatorname{argmin}} (U\phi(x))^T W(V\varphi(y)) \qquad (13)$$

Text Images

Images 14, 24 may be received by the recognition system 10 in any convenient file format, such as JPEG, GIF, JBIG, BMP, TIFF, or the like or other common file format used for images and which may optionally be converted to another suitable format prior to processing. Input images may be stored in data memory 36 during processing. Images 14, 24 can be input from any suitable image source, such as a workstation, database, memory storage device, such as a disk, image capture device, or the like. In general, each input digital image includes image data for an array of pixels forming the image. The images may be individual images, such as photographs, video images, or combined images, or the like. In general each image 24 may be a digital photograph that is expected to include a text region 14 in which characters of a text string are visible as a set of pixels of the image. The image data of the image may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The exemplary embodiment may be used for black and white (monochrome) images or for images which have been converted to monochrome for convenient processing.

In the case of license plates, for example, segmentation processes have been developed which identify the most likely region 14 of an image 24 where the license plate is to be found by comparing the image 24 with images which have been previously segmented in this way. See, for example, above-mentioned U.S. Pub No. 20130182909 to Rodríguez Serrano, incorporated herein by reference.

Image Embedding (S106, S204)

An image representation or "signature" 20 is generated from each cropped image 14 based on low level features extracted from the image, such as color or gradient features, and analogously for the training images 68. While any feature extraction method can be used, as discussed below, in the exemplary embodiment, a bag-of-patches framework is used. In this method, low-level features are extracted from local patches at multiple scales and statistics computed for each patch in the form of a patch descriptor. These patch descriptors are then aggregated at an image level. For example, using the Fisher Vector (FV) principle, it is assumed that a generative model of patches exists (such as a Gaussian Mixture Model (GMM)) and the gradient of the log-likelihood of the descriptor is measured with respect to the parameters of the model. To include spatial information about the word image into the signature, the image can be partitioned into regions, the per-patch statistics aggregated at a region level, and then the region-level signatures concatenated to form the image signature.

While particular reference is made to Fisher vectors, other methods for computing an image signature are also contemplated. The signature 20 generated by the text image representation generator 54 for each image 14 can be any suitable high level statistical representation of the respective image, such as a multidimensional vector generated based on features extracted from the image. Fisher Kernel representations and Bag-of-Visual-Word representations are exemplary of suitable high-level statistical representations which can be used herein as an image signature. The exemplary image signatures are of a fixed dimensionality, i.e., each image signature has the same number of elements. In general, each image signature 20 has at least 30, or at least 60, or at least 100, or at least 500 dimensions, and up to 1000 or more dimensions, each dimension having a respective feature value, which may be reduced to fewer dimensions.

In one embodiment, the representation generator 54 includes a patch extractor, which extracts and analyzes low level visual features of patches of the image 14, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. For example, at least 10 or at least 20 or at least 50 patches are extracted from each image. Each patch may comprise at least 40 or at least 100 pixels, and up to 1,000,000 pixels or more.

The extracted low level features (e.g., in the form of a local descriptor, such as a vector or histogram) from each patch can be concatenated and optionally reduced in dimensionality, to form a feature vector which serves as the global image signature. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed, as in the case of the Fisher vector described above. For example, as local descriptors extracted from the patches, SIFT descriptors or other gradient-based feature descriptors, can be used. See, e.g., Lowe, "Distinctive image features from scale-invariant keypoints," IJCV vol. 60 (2004). Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 32 or 64 dimensions, using Principal Component Analysis (PCA). Signatures can be computed for two or more regions of the image and aggregated, e.g., concatenated.

The signatures may be indexed or compressed using conventional techniques (locality sensitive hashing (LSH), product quantization, principal component analysis (PCA), etc.) to speed up the process.

In the case of a Fisher vector, vector elements each represent the gradient with respect to one or more of the model parameters (mean vector, covariance matrix, and weight assigned to the Gaussian function in the parameter training) of each of the Gaussians in the GMM. It can be assumed that the covariance matrices are diagonal. See, e.g., Perronnin, et al., "Fisher kernels on visual vocabularies for image categorization" in CVPR (2007). Methods for computing Fisher vectors are more fully described U.S. Pub. Nos. 20120076401 and 20120045134, F. Perronnin, et al., "Improving the Fisher kernel for large-scale image classification," in ECCV, *Part IV*, pages 143-156 (2010), and in Jorge Sánchez and Florent Perronnin, "High-dimensional signature compression for large-scale image classification," in CVPR 2011, the disclosures of which are incorporated herein by reference in their entireties.

Other exemplary methods for computing image signatures are disclosed for example, in the following references, the disclosures of all of which are incorporated herein in their entireties, by reference: US Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853, and 20120158739.

In an exemplary embodiment, the low-level features are gradient features, such as SIFT descriptors, one per patch. The dimensionality of these descriptors is reduced from 128 to 32 dimensions with PCA. A visual vocabulary of 64 Gaussians is used in the GMM and only the gradient with respect to the mean parameters is considered. The word image 14 is split into 8 regions (2×4). This results in a 32×64×4=8, 192-dimensional FV signature.

While the exemplary method considers license plate or other images in which the sequence of characters forms a single row, it is also the case that character strings may be split over two or more rows. In One embodiment, such an image may be segmented into rows and the rows concatenated to form a single row image. In other embodiments, an image is segmented into words and each word is considered as a separate sequence of characters.

Label Embedding

The text label(s) 12 to be matched can be embedded in a Euclidean space by computing an explicit representation of the label: a spatial pyramid bag-of-characters (SPBOC) (S112, S206).

The function $\phi$ is used to embed character strings, such as words in a binary code e.g., ASCII words (or UTF-8), into a Euclidean space. This embedding is intended to respect some similarity between words, such that two similar words are close to each other in the Euclidean space after embedding. There are several ways to measure the similarity between two words (lexical vs. semantic) and some of them are less well suited to the case of text recognition. In the present case, it is appropriate to preserve the lexical similarity, this means that words which contain the same letters in the same order should be closer to each other after the embedding. One suitable embedding technique which preserves the lexical similarity is described in Rodríguez Serrano 2013.

Briefly, in this method, is assumed that the words in the images 14 are composed of characters in a finite set of characters. For example, for a license plate recognition method, the set of possible characters L is the set of possible letters and figures in the alphabet $\mathcal{L} = \{A,B,C,D, \ldots Z\} \cup \{0,1,2,3,4,5,6,7,8,9\}$. In this embodiment, $\mathcal{L} = 26+10=36$ characters. As will be appreciated, other characters may be considered depending on the application or the target language. Special characters may also be considered such as a space amounting to at least a predefined gap between two characters.

The words could simply be embedded into an $\mathcal{L}$-dimensional space by counting the number of occurrences of each character. Such a representation would correspond to a bag-of-characters (BOC). Such a histogram representation could then subsequently normalized, using, for example the $l_1$ norm or the $l_2$ norm (or any $l_p$ normalization technique).

To include information about the order of characters, in the exemplary embodiment, a spatial pyramid representation (SPBOC) may be employed, rather than a simple BOC. In this method, a word (such as the letters ABODE in) is partitioned into a plurality of regions (the entire character string can be considered as a first of the regions). For example, a split of ABODE into two regions would give A, B and ½C in one region and ½C, D, and E in the other. In one embodiment, this results in a sequence of two, three, four, or more spatial levels, each level (apart from the first) being formed by partitioning each of the region(s) in the previous (higher) level into two or more smaller regions. The partitioning is performed perpendicular to the direction of the text. Thus, for example, if the second level includes two or three regions, the third level includes at least twice that number, and so on, with each successive level including more regions than the last, all of the regions at a given level together constituting the entire text string. Each region includes at least a part of a character in the text string. The characters of each type in each region are counted to generate a representation of the region, in which parts of characters being counted in proportion to the percentage of the character which falls into the region. The region representation can thus be based on a histogram of the counts. The region representation may be a vector having an element for each character in the set of characters each element having a value which is based on the number of occurrences of that character in the respective region. For example, the counts are normalized so that the elements of the vector sum to 1.

The image representation is generated by aggregating the region representations, e.g., by concatenating them.

As will be appreciated, other techniques may be employed to embed ASCII words into a Euclidean space, such as an unsupervised learning method.

Without intending to limit the scope of the exemplary embodiment, the following Examples demonstrate the applicability of the method to license plate recognition.

EXAMPLES

The three approaches described above were compared on a dataset of license plates. The dataset contains 4,215 images for training and validation purposes and 4,215 images for testing purposes. Each image is associated with its textual transcription (label). Images are encoded using a Fisher Vector representation (64 Gaussians per mixture, gradients with respect to the mean vectors only) over densely extracted SIFT descriptors reduced to 32 dimensions with PCA. A 2×4 spatial pyramid was used, leading to a total of 32×64×4×2=16, 384 dimensions. The text strings are encoded using a spatial pyramid of characters as described above, with an alphabet of 36 symbols $\mathcal{L} = \{A, \ldots, Z, 0, \ldots, 9\}$ and 4 levels in the SPBOC, leading to a total of (1+2+4+8)×36=504 dimensions.

When learning the similarity functions, a maximum of 10,000 epochs was considered, although most approaches converged significantly before that. When performing the stochastic update, a constant step size of $\eta = 1 \times 10^{-2}$ was used, which was found to be the best performing one over all the methods, although it is to be appreciated when implementing the exemplary method, a step size best suited to the method can be selected.

To evaluate the image-to-text performance, each of the 4,215 test images was used as a query and the text strings (labels) ranked according to their similarity. The precision at one is determined, i.e., does the first retrieved text string match the image contents? The precision of all the queries is averaged and the mean precision at one (P@1) is computed. Similarly, to evaluate the text to image performance, each of the 4,215 text strings is used to rank the images.

Algorithms 1-3 were used in the following approaches, as described above:

1. Baseline. The compatibility between text y and image x is defined as $F(x, y; W) = \phi(x)^T W \phi(y)$. The learning enforces only the text-to-image goal.

2. Direct. The compatibility between text y and image x is defined as F (x, y; W)=φ(x)$^T$Wφ(y). The learning enforces the text-to-image goal while explicitly enforcing text strings to be badly ranked.

3. Biased. The compatibility between text y and image x is defined as F(x, y; W, V)=φ(x)$^T$Wφ(y)+V$^T$φ(y). The learning enforces the text-to-image goal while explicitly enforcing text strings to be badly ranked as for the Direct method.

Figure 4:
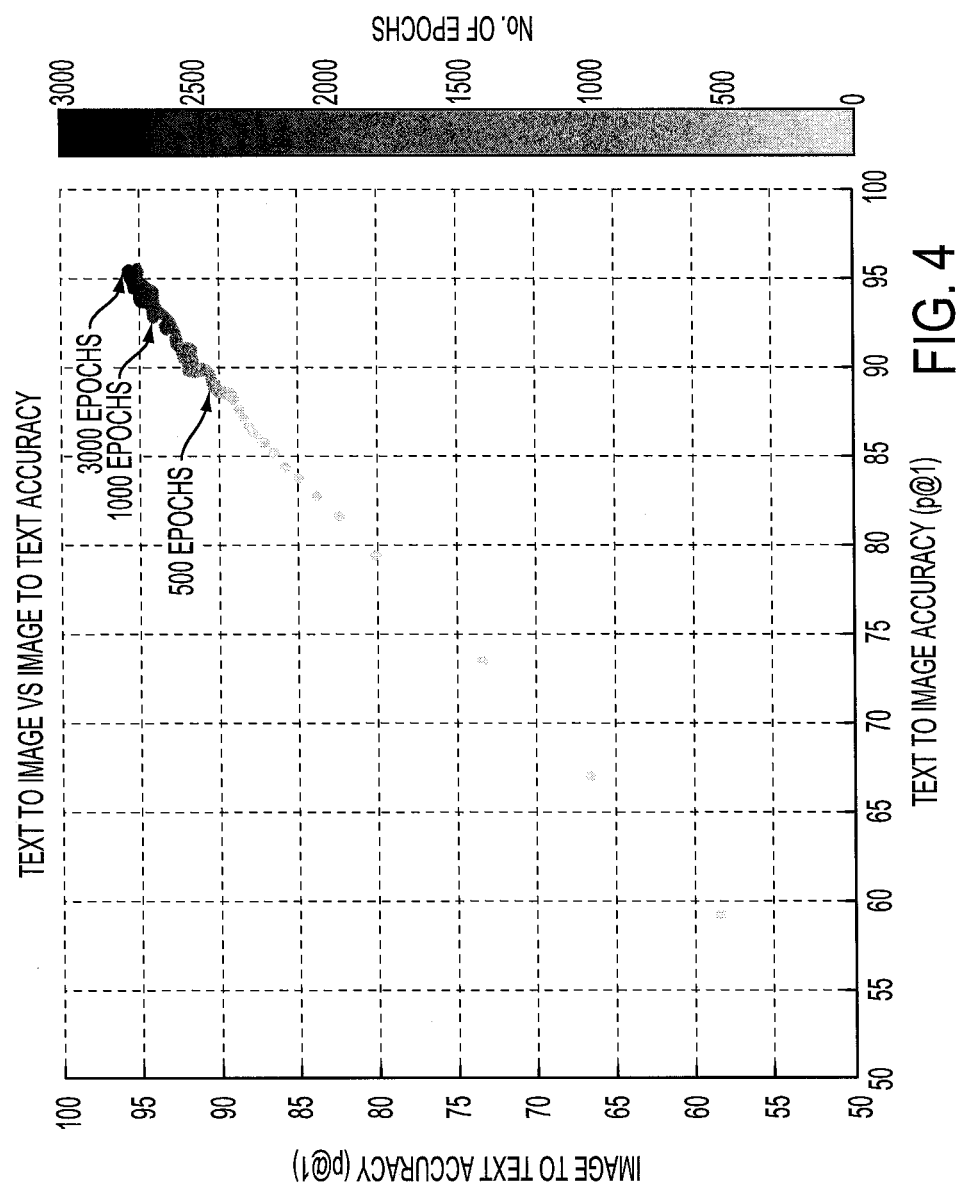
FIG. 4 illustrates a plot of image-to-text accuracy vs. text-to-image accuracy for different numbers of training epochs in a Baseline approach.

FIG. 4 shows the results for the Baseline approach. Image-to-text accuracy is plotted as a function of the text-to-image accuracy, for different numbers of epochs used during learning. The results converged after approximately 2,000 epochs. It can be observed that, despite optimizing only the text-to-image accuracy, the image-to-text accuracy increases at approximately the same rate. After convergence, both image-to-text and text-to-image obtain an approximately 96% accuracy (P@1).

For the Direct and Biased approaches, different α weightings were evaluated for the text-to-image and image-to-text losses. When a very large α was used, this led to poor results since the large weight on the image-to-text loss made very difficult to optimize the text-to-image objective. On the other hand, very small α's lead to results that do not negatively affect the image-to-text accuracy. α's of $10^{-3}$ and $10^{-4}$ were found to provide meaningful results. However it is to be appreciated that a different value of α may be suited to different applications.

Figure 5:
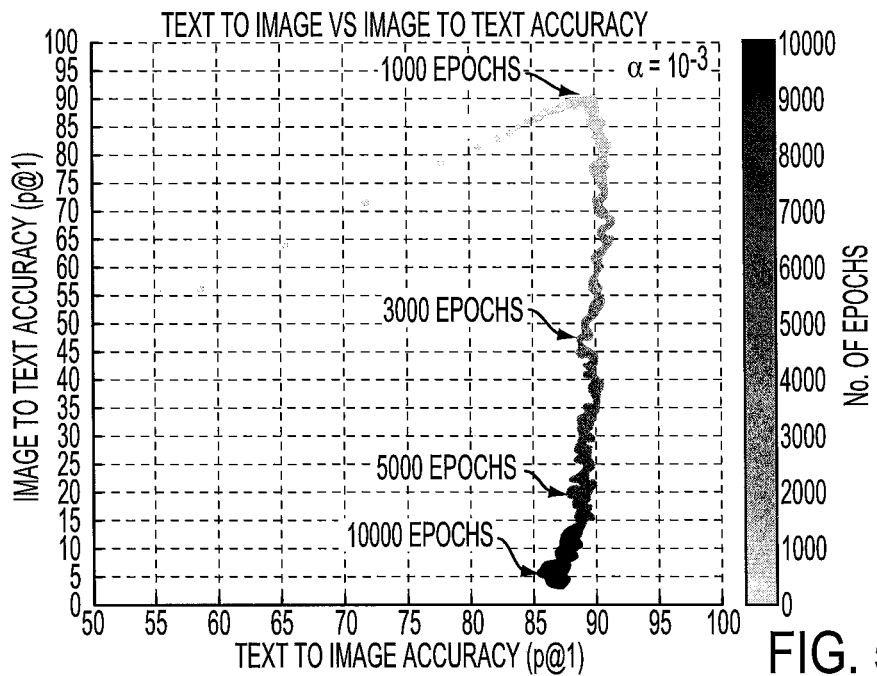
FIGS. 5 and 6 illustrate plots of image-to-text accuracy vs. text-to-image accuracy for different numbers of training epochs in a Direct approach for $\alpha=10^{-3}$ and $\alpha=10^{-4}$, respectively.
Figure 6:
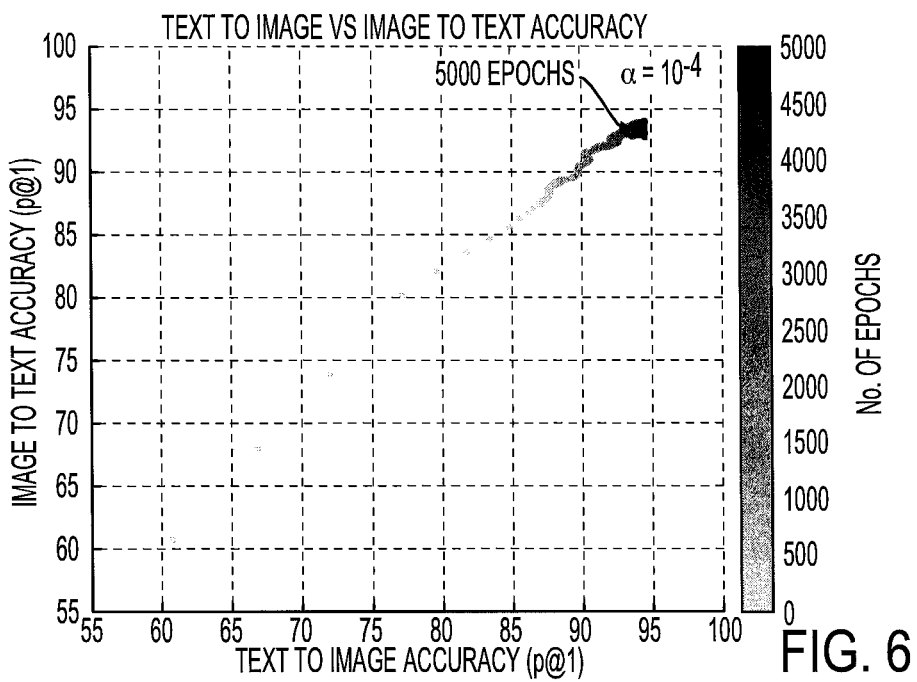
Figure 7:
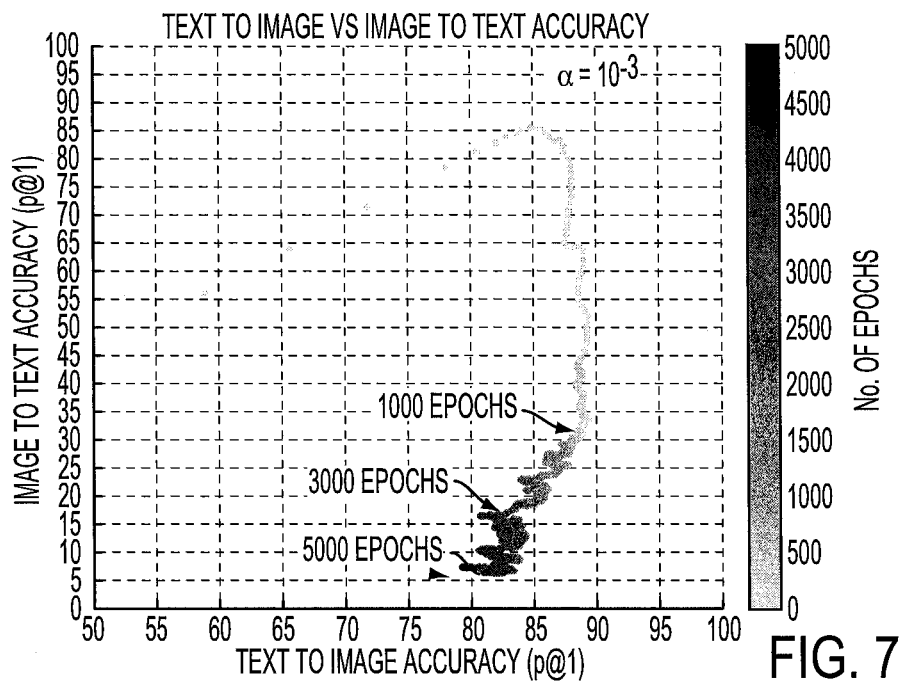
FIGS. 7 and 8 illustrate plots of image-to-text accuracy vs. text-to-image accuracy for different numbers of training epochs in a Biased approach for $\alpha=10^{-3}$ and $\alpha=10^{-4}$, respectively.
Figure 8:
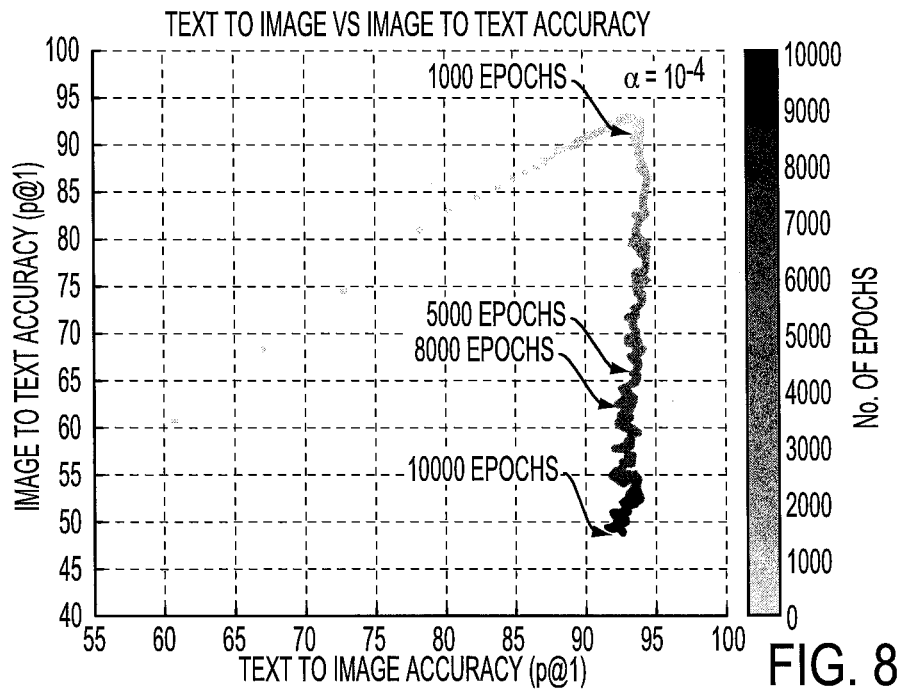
Figure 9:
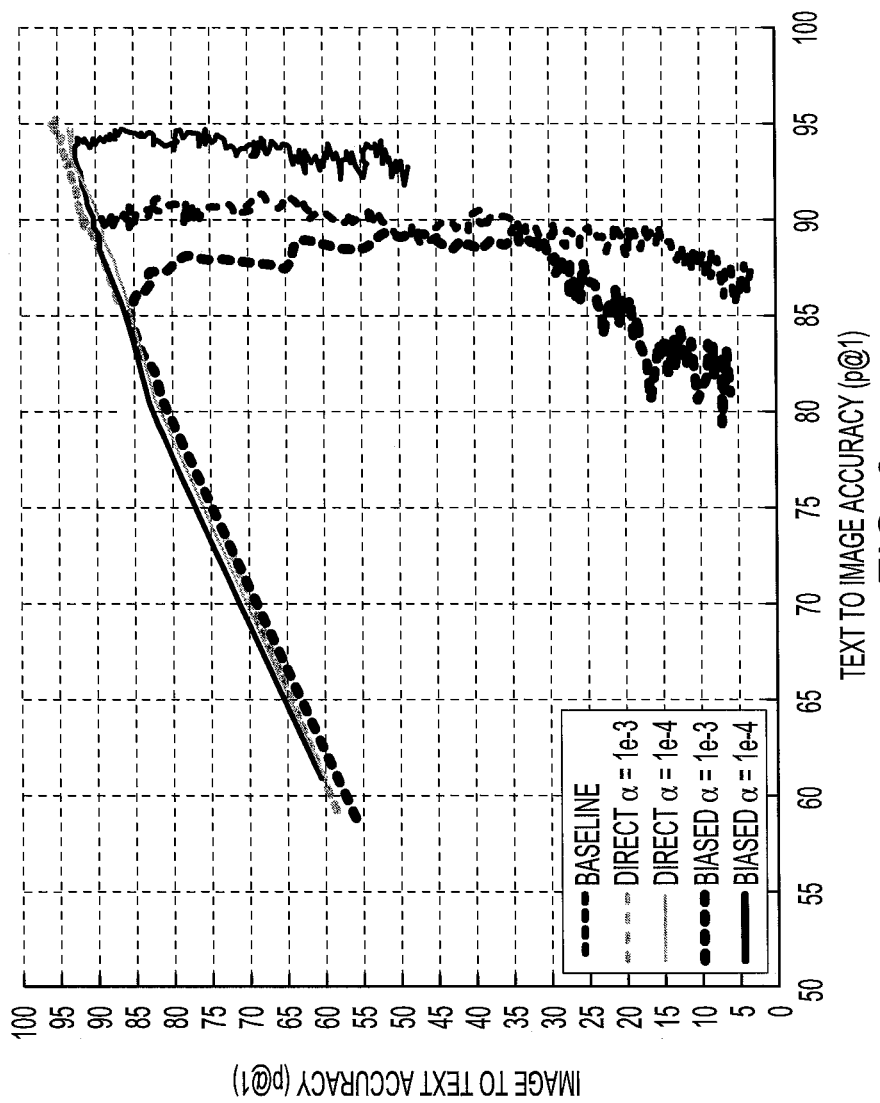
FIG. 9 provides a comparison of the results shown in FIGS. 4-8.

FIGS. 5 and 6 show results for the Direct approach for α=$10^{-3}$ and α=10-4, respectively. FIGS. 7 and 8 show equivalent results for the Biased approach for α=$10^{-3}$ and α=$10^{-4}$, respectively. FIG. 9 provides an overview of the results.

The results suggest that the selection of the weighting factor α can have a significant impact on the performance of the system. A high α leads to a difficult to optimize function that does not achieve high text-to-image accuracy. A low α function leads to a function that does not perform badly enough on image-to-text (at least for some applications).

Comparing the Direct and Biased methods, the results suggest that when the α weighting is high enough (FIGS. 5 and 7), both approaches perform similarly, although the Direct approach seems to have a slight lead. However, when the α is smaller (FIGS. 6 and 8), both approaches perform very differently: the Direct approach yields high performance for both tasks even at relatively large numbers of epochs, similar to the baseline. However, the Biased approach has more flexibility, and manages to decrease the image-to-text accuracy, as desired, while retaining a high text-to-image accuracy.

In general, both direct and biased approaches require many more epochs to converge satisfactorily than does the baseline method. This is not surprising since it appears to be a much more difficult problem to optimize. In the case of the Biased approach with α=$10^{-4}$, the approach was still improving after the 10,000 epochs budget, so it is anticipated that better results could be achieved with an even larger number of epochs, with potentially a drop in the image-to-text accuracy at higher numbers of epochs.

The results also suggest that there is a trade-off between maintaining text-to-image accuracy and lowering the image-to-text matching to an acceptable level. The method used may thus be application dependent. For those applications where it is desirable to retain as high a text-to-image accuracy as possible, the Biased approach is the best option: the image-to-text matching accuracy can be reduced to about 50% while losing only 2-3 percentage points in text-to-image accuracy (FIG. 8). It may be noted that this occurs before full convergence. However, if the goal is to get the image-to-text matching as low as possible, its accuracy can be reduced to as low as 5% while sacrificing less than 10 points in the text-to-image matching by using the Direct approach (FIG. 5). On the other hand, if the aim is to generate a reasonably accurate system quickly, the Biased approach can yield a text-to-image accuracy of close to 90% after only 1000 epochs (FIG. 7). Further studies with different values of α and/or different numbers of epochs could be used to tailor the system to the needs of the application.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for text-to-image matching comprising:
   storing a set of text image representations, each text image representation having been generated by embedding a respective text image into a first vectorial space with a first embedding function;
   with a second embedding function, embedding a character string into a second vectorial space to generate a character string representation;
   for each of at least some of the text image representations, computing a compatibility between the character string representation and the text image representation, comprising computing a function of the text image representation, character string representation, and a transformation, the transformation having being derived by minimizing a loss function on a set of labeled training images, the loss function including a text-to-image-loss and an image-to-text loss; and
   identifying a matching text image based on the computed compatibilities,
   wherein at least one of the embedding and the computing of the compatibility is performed with a processor.

2. The method of claim 1, wherein the loss function further includes a term which is not used in the computing of the compatibility.

3. The method of claim 1, wherein the text-to-image-loss penalizes incorrect ranking of images, given a label corresponding to only one of the images and the image-to-text loss penalizes correct ranking of labels, given an image corresponding to only one of the labels.

4. The method of claim 1, wherein the compatibility function is a function of φ(x)$^T$Wφ(y), where φ(x) represents the text image representation, φ(y) represents the character string representation, and W represents the transformation.

5. The method of claim 1, further comprises outputting information based on the identified text image.

6. The method of claim 5, wherein the output information is derived from metadata associated with the text image.

7. The method of claim 1, wherein the matching text image is identified by identifying the text image for which the compatibility function is maximized.

8. The method of claim 1, wherein the transformation is a d×D dimensional compatibility matrix, where D is the dimensionality of the character string representation and d is the dimensionality of the text image representations.

9. The method of claim 8, wherein d is larger than D.

10. The method of claim 1, wherein the text image representations are Fisher vectors.

11. The method of claim 1, wherein the character string representations are derived by partitioning the character string into a plurality of regions at each of a plurality of levels, generating a representation of each region based on the characters in the region, and computing a representation of the character string based on the region representations.

12. The method of claim 1, wherein the text images are license plate images and the character strings are license plate numbers.

13. A computer program product comprising a non-transitory recording medium storing instructions which when executed by a computer, perform the method of claim 1.

14. A system comprising memory which stores instructions for performing the method of claim 1 and a processor in communication with the memory for executing the instruction.

15. A method for learning a compatibility function for use in a text-to-image matching system comprising:
for each of a set of training images, each labeled with a respective character string, generating a text image representation by embedding the training image into a first vectorial space with a first embedding function;
with a second embedding function, embedding the character strings into a second vectorial space to generate character string representations;
learning a compatibility function which is a function of a compatibility matrix, a character string representation of a character string to be matched, and a text image representation for one of a set of text images, the learning including identifying a compatibility matrix which minimizes a loss function on the set of labeled training images, the loss function aggregating a text-to-image-loss and an image-to-text loss; and
outputting the learned compatibility function including the compatibility matrix which minimizes the loss function,
wherein at least one of the embedding and the learning of the compatibility function is performed with a processor.

16. The method of claim 15, wherein the learned compatibility function enables text-to-image matching to be performed with higher accuracy than image-to-text matching.

17. The method of claim 15, wherein the compatibility function is of the form $F(x,y;W)=\phi(x)^T W \phi(y)$, where $\phi(x)$ represents the text image representation, $\phi(y)$ represents the character string representation, and W represents the compatibility matrix.

18. The method of claim 15, wherein the text-to-image loss is an aggregate of losses of the form $\ell_{t2i} = \max(0, 1 + \Delta^T W \phi(y_i))$ and the image-to-text loss is an aggregate of losses of the form $\ell_{i2t} = \max(0, 1 + \phi(x_i)^T W \hat{\Delta})$, where $\Delta$ represents a difference between two of the image representations and $\phi(y_i)$ is a character string representation for a label of one of them and $\hat{\Delta}$ represents a difference between the character string representations of two of the labels and $\phi(x_i)$ is a text image representation of a text imaging having one of the labels.

19. The method of claim 15, wherein the loss function minimizes the empirical loss over the training set as a function of a weighted sum of the text-to-image loss and the image-to-text loss.

20. The method of claim 19, wherein the loss function further includes a term which is not used in the compatibility function.

21. A system comprising:
a text image representation generator which, for each of a set of training images, each labeled with a respective character string, generates a text image representation by embedding the training image into a first vectorial space with a first embedding function;
a text string representation generator which embeds the character strings into a second vectorial space with a second embedding function to generate character string representations;
a training component which learns a compatibility function which is a function of a compatibility matrix, a character string representation of a character string to be matched, and a text image representation for one of a set of text images, the learning including identifying a compatibility matrix which minimizes a loss function on the set of labeled training images, the loss function aggregating, over the set of images, a text-to-image-loss and an image-to-text loss;
a processor which implements the text image representation generator, text string representation generator, and training component.

22. The system of claim 21, further comprising: a comparator which, given a representation of a text string to be matched, performs a comparison between the representation of the text string to be matched and each of a set of image representations using the learned a compatibility function.

* * * * *